United States Patent [19]

Yamanaka et al.

[11] Patent Number: 4,705,719
[45] Date of Patent: Nov. 10, 1987

[54] SYNTHETIC PAPER OF MULTILAYER RESIN FILMS

[75] Inventors: Masaaki Yamanaka; Masayuki Inoue; Harumitsu Asazuma, all of Ibaraki, Japan

[73] Assignee: Oji Yuka Goseishi Co., Ltd., Tokyo, Japan

[21] Appl. No.: 870,951

[22] Filed: Jun. 5, 1986

Related U.S. Application Data

[63] Continuation of Ser. No. 868,054, May 29, 1986, abandoned.

[30] Foreign Application Priority Data

Jun. 5, 1985 [JP] Japan ................. 60-121897
Apr. 23, 1986 [JP] Japan ................. 61-93554

[51] Int. Cl.$^4$ .................... B32B 5/16; B32B 27/00
[52] U.S. Cl. ........................ 428/323; 428/330; 428/331; 428/336; 428/474.7; 428/918; 428/476.3; 428/476.9; 428/910; 428/537.5; 428/517; 428/483; 101/426
[58] Field of Search ............ 428/910, 330, 537.5

[56] References Cited

U.S. PATENT DOCUMENTS

| | | | |
|---|---|---|---|
| 4,340,639 | 7/1982 | Toyoda et al. | 428/516 |
| 4,410,582 | 10/1983 | Tsunashima et al. | 428/354 |
| 4,500,598 | 2/1985 | Thoese | 428/518 |
| 4,597,818 | 7/1986 | Aoyama et al. | 428/517 |

Primary Examiner—P. C. Ives
Attorney, Agent, or Firm—Oblon, Fisher, Spivak, McClelland, & Maier

[57] ABSTRACT

Synthetic paper of multilayer resin films is described, comprising a base layer (1a) constituted by a biaxially stretched film made of the thermoplastic resin, and a laminate provided onto at least one of opposite surfaces of said base layer, said laminate including a paper-like layer (1b) and a surface layer (1c), said paper-like layer being constituted by a uniaxially stretched film made of a thermoplastic resin containing 8 to 65% by weight of inorganic fine powder, said surface layer being constituted by a uniaxially stretched film made of a thermoplastic resin, said surface layer having a thickness t satisfying the following expression $$R \geq t \geq (1/10) \times R$$

in which R represents an average particle diameter of said inorganic fine powder existing in the paper-like layer.

The synthetic paper is superior in paper supply property, in printability, in dryness of offset ink, and in surface strength and it is substantially free from paper dust trouble.

4 Claims, 1 Drawing Figure

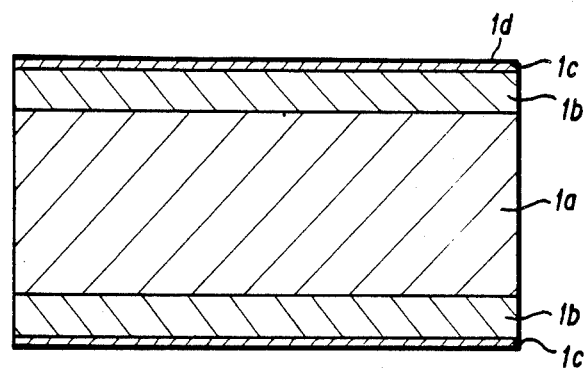

SYNTHETIC PAPER OF MULTILAYER RESIN FILMS

RELATED APPLICATIONS

This application is a continuation of application Ser. No. 06/868,054, filed May 29, 1986 now abandoned.

FIELD OF THE INVENTION

The present invention relates to synthetic paper having a multilayer-structure, which is superior in paper supply property, in printability, in dryness of offset ink, and in surface strength, and which is substantially free from a so-called paper dust trouble.

This synthetic paper is useful as material for poster paper, packaging paper, label paper, etc.

BACKGROUND OF THE INVENTION

Substituting for natural pulp-made paper, there has been proposed and practically used synthetic paper which comprises a base layer constituted by a biaxially stretched polypropylene film, and paper-like layers provided onto both surfaces of the base layer and constituted by a uniaxially stretched polypropylene film containing 8 to 65% by weight of inorganic fine powder. (Reference is made to Japanese Patent Publication No. 40794/71 and Japanese Patent Application (OPI) Nos. 141339/81 and 118437/81 (the term "OPI" as used herein refers to a "published unexamined Japanese patent application").)

The synthetic paper of this kind has fine pores around the particles of the inorganic fine powder as nuclei, and further, has a lot of elongated, cracks at its surfaces. Accordingly, the paper is light in weight, and excellent in dryness of printing ink, adhesion with printing ink, writing property with a pencil and water proofness.

To impart better offset printing property, this synthetic paper is used in the state where an aqueous solution of acryl-series copolymers, polyethyleneimines, or the like, is coated to the surfaces in an amount of 0.005 to 0.1 g/m$^2$ as solid, and then dried. (Reference is made to Japanese Patent Application (OPI) Nos. 10624/75, 161478/75, 40883/73, and 149363/82.)

Since the paper-like layer is constituted by a stretched film of a thermoplastic resin containing inorganic fine powder, and since the coated resin layer is made thin in thickness so as not to exceed 0.1 micron, the surfaces of the synthetic paper are rough (Bekk index measured in accordance with JIS P-8119 is 100 to 2,000 seconds).

Before the coated resin layer has been applied, the paperlike layer of the synthetic paper is in such a state that the inorganic fine particles, which form the nuclei of fine pores and surface cracks as described above, partly project from the surfaces of thereof so that the inorganic fine particles are apt to come off from the surface layer (a so-called paper dust trouble). Undesirably, the paper dust trouble may cause deterioration in continuous printability due to the mixture of the coming-off particles into printing ink or may cause dust in computer rooms, CAD drawing rooms, and other so-called clean rooms.

In the case where a tack tape stuck onto a printed surface of the synthetic paper is stripped off, there is such a disadvantage that the printing ink is stripped off together because of weak surface strength of the paper.

The synthetic paper provided with a coated resin layer in order to improve offset printing properties as described in the latter case is a little superior in prevention of the paper dust trouble. The improvement, however, does not have much effect on the prevention of the paper dust trouble, since the applied layer is thin in thickness, for example, about 0.01 micron.

To prevent the paper dust trouble from occurring, there has been also proposed high-glossy synthetic paper in which a resin film layer containing no inorganic fine powder or a very little inorganic powder (of 3% by weight or less) is provided on the surface of the paper like layer (1b) containing the inorganic fine powder (Japanese Patent Application No. 124882/84 corresponding to Japanese Patent Application (OPI) No. 3748/86, and U.S. application Ser. No. 739,818). The paper is superior in that no dust, high surface strength and high gloss printing can be performed, but inferior in writing properties with a pencil and an aqueous ink pen. Furthermore, the paper has a defect that ink is not so rapidly dried.

SUMMARY OF THE INVENTION

An object of the present invention is, therefore, to improve such multilayer synthetic paper as described in the above-mentioned Japanese Patent Application No. 124882/84.

Another object of the present invention is to provide synthetic paper which is excellent in surface strength, in writing property with aqueous ink, and in writing property with pencil, and which is substantially free from a paper dust trouble.

To attain the foregoing objects, according to the present invention, the synthetic paper of multilayer resin films is arranged to comprise a base layer (1a) constituted by a biaxially stretched film made of the thermoplastic resin, and a laminate provided onto at least one of opposite surfaces of the base layer, the laminate including a paperlike layer (1b) and a surface layer (1c), the paper-like layer being constituted by a uniaxially stretched film made of a thermoplastic resin containing 8 to 65% by weight of inorganic fine powder, the surface layer being constituted by a uniaxially stretched film made of a thermoplastic resin, the surface layer having a thickness t satisfying the following expression $$R \geq t \geq (1/10) \times R$$

in which R represents an average particle diameter of the inorganic fine powder existing in the paper-like layer.

Preferably, the thickness of the surface layer is selected to be from 0.15 to 2 microns.

The synthetic paper has a further advantage that the gloss thereof is lower than that of the paper disclosed in the above mentioned Japanese Patent Application No. 124882/84, and accordingly, reading letters written on the paper little taxes the eye.

BRIEF DESCRIPTION OF THE DRAWING

The drawing is a cross-sectional view of synthetic paper according to the present invention.

DETAILED DESCRIPTION OF THE INVENTION

Of the synthetic paper according to the present invention, that having the simplest structure is arranged such that a laminate including a paper-like layer (1b) constituted by a uniaxially stretched film of a thermoplastic resin containing to be 8 to 65% by weight of inorganic fine powder and a surface layer (1c) constituted by a uniaxially stretched film of a thermoplastic resin containing 0 to 3% by weight of inorganic fine powder is provided on the front surface or on each of the front and rear surfaces of a base layer (1a) constituted by a biaxially stretched film of a thermoplastic resin; and that if necessary, a primer (1d) (applied resin layer) is coated onto the surface of the surface layer (1c), the primer being selected from the group consisting of a polyethyleneimine, a poly(ethyleneimineurea), an ethyleneimine-adduct of polyamine polyamide, an epichlorhydrin-adduct of polyamine polyamide, and a quaternary nitrogen-containing acrylic polymer.

This multilayer synthetic paper has a laminated construction produced through a process comprising: stretching a thermoplastic resin film containing 0 to 50% by weight of inorganic fine powder in one direction at a temperature lower than the melting point of the resin to thereby prepare a uniaxially oriented film; stacking a laminate constituted by a molten film of a thermoplastic resin containing 8 to 65% by weight of inorganic fine powder and another molten film of a thermoplastic resin containing 0 to 3% by weight of inorganic fine powder onto one or each of the opposite surfaces of the uniaxially oriented film to obtain a stacked structure; and stretching the stacked structure perpendicularly to the above direction to thereby obtain the laminated construction including a uniaxially oriented surface layer or layers (1c), a uniaxially oriented paper-like layer or layers (1b) having numerous fine pores, and a biaxially oriented base layer (1a).

Although the simplest structure of the base layer (1a) consists of a single layer, the base layer may have a multilayer structure in which one or more resin layers are interposed between the paper-like layer and the base layer.

The base layer (1a) of biaxially stretched film contributes to the balance in strength in the longitudinal and transverse directions of the synthetic paper. The uniaxially stretched film of the paper-like layer (1b) presents a paper-like feel. If constituted by a biaxially stretched film, the paper-like layer has pearlescent gloss which is far from a paper-like feel.

Examples of the thermoplastic resin include polyolefin (for example, polyethylene, polypropylene, ethylene/propylene copolymer and ethylene/vinyl acetate copolymer), poly(4-methylpentene-1), polystyrene, polyamide, polyethylene terephthalate, partial hydrolyzate of ethylene/vinyl acetate copolymer, ethylene/acrylic acid copolymer and its salts, vinylidene chloride copolymers (for example, vinyl chloride/vinylidene chloride copolymer, styrene/polypropylene copolymer prepared by the following process, etc.), and the mixtures thereof.

SYNTHESIS OF STYRENE/POLYPROPYLENE COPOLYMER

After 100 parts by weight of polypropylene particles are dispersed in water, 30 to 400 parts by weight of styrene are added thereto so as to be subject to suspension polymerization of styrene to thereby obtain styrene/polypropylene copolymer particles.

The styrene/polypropylene copolymer particles can be produced, for example, by a method comprising dispersing 100 parts by weight of polypropylene in 250 to 1,000 parts by weight of water through a dispersing agent, such as sodium dodecylbenzenesulfonate, polyvinyl alcohol, or the like; adding thereto 30 to 400 parts by weight of styrene having a dissovled polymerization initiator, such as t-butyl benzoate, benzoyl peroxide, or the like, while stirring; and heating the mixture to 90° to 140° C. to perform suspension polymerization of styrene.

Being a polyalloy of polystyrene and polypropylene, the copolymer is superior in compatibility to a simple blend of polystyrene and polypropylene. The surfaces of the copolymer, however, become rough because of lack of compatibility between polystyrene and polypropylene owing to stretching, that is, the surfaces of the copolymer become more rough than those of single polypropylene. Therefore, by the use of the styrene/polypropylene copolymer as surface layer resin, synthetic paper is improved in the writing property with pencil. Furthermore, the gloss of the synthetic paper is lower, and accordingly, reading letters printed on the paper little taxes the eye.

In addition, since polystyrene is present on the surfaces of the paper, the paper is more excellent in transferring of printing ink than that of single polypropylene.

Of these, the preferred in view of waterproofness and resistance to chemicals are polypropylene and polyethylene. When polypropylene is used in the base layer, it is preferable that a resin having a melting point lower than that of polypropylene, such as polyethylene, polystyrene, ethylene/vinyl acetate copolymer, or the like, is added by an amount of 3 to 25% by weight thereto in order to improve the stretchability thereof.

It is preferable that the respective thermoplastic resins constituting the surface layer, the paper-like layer, and the base layer are made of the same kind to adhere to each other firmly. In this case, the use of a resin having a melt index higher than that of the resin of the base layer (measured, for example, in accordance with JIS K-6758 and JIS K-6760) facilitates the stretching of the films.

Examples of the inorganic fine powder used include calcium carbonate, silica, diatomaceous earth, talc, titanium oxide, barium sulfate, etc., each having a particle diameter of 0.03 to 16 microns.

Particularly, it is preferable that the paper-like layer, (1b) contains 2% by weight or more of inorganic fine powder having a specific surface area of 100 $m^2/g$ or more, and more preferably, of 150 to 400 $m^2/g$, in the film composition thereof. Use of such inorganic fine powder having a large surface area can accelerate the dryness of ink in the synthetic paper.

Examples of the inorganic fine powder having a specific surface area of 100 $m^2/g$ or more include synthetic silicate, fine silicic acid, synthetic sodium aluminosilicate, etc. The synthetic silicate may be, for example, that is sold by FUJI DEVISON CHEMICAL Ltd. in the trade name of "SILOID 244" which contains 75% by weight or more of $SiO_2$ and has a specific surface area of 300 $m^2/g$ and an average particle diameter of about 1 micron. The fine silicic acid may be, for example, that is sold by NIHON SILICA Co., Ltd. in the trade name of "NIPSIL VN3" which has a specific surface area of 240 $m^2/g$ and an average particle diameter of about 1 micron. The synthetic sodium aluminosilicate may be, for example, that is sold by KOFRAN Inc. in the trade name of "ZEOLEX 17S" which has a specific surface area of 135 $m^2/g$ and an average particle diameter of about 1 micron.

The content of inorganic fine powder contained in the film forming resin composition is largely varied depending on the characteristic of the resulting paper, that is, depending on the fact whether the paper is required to be transparent, semitransparent or opaque. Generally, when the paper must be transparent or semitransparent (for example, in the case of trace paper), the content is selected to be 8 to 50% by weight, and preferably 8 to 42% by weight. When the paper must be opaque (for example, in the case of poster paper or sticker paper), the content is selected to be 35 to 65% by weight. The transparency and semitransparency of the synthetic paper greatly depends on the conditions of stretching temperature and stretching rate, in addition to the content of inorganic fine powder, and, accordingly, the content of inorganic fine powder should be determined collectively as a whole.

When two kinds of inorganic fine powder, that is, powder (a) having a specific surface area of 100 m$^2$/g or more, and powder (b) having a specific surface area less than that of the powder (a), are added to the resin, it is more effective in improvement in the dryness of ink to prepare the film forming resin composition through mixing 5 to 40 parts by weight of the inorganic fine powder (a) with 100 parts by weight of the inorganic fine powder (b) to cause the latter to carry the former, and then adding the resulting powder mixture to the resin, than the case where the resin and the two kinds of powder (a) and (b) are simultaneously stirred and mixed with each other.

The simplest process for causing the powder (b) to carry the powder (a) may be a so-called high-speed stirring mixture process, in which 100 parts by weight of inorganic fine powder (b) having a little specific surface area and 2.5 parts by weight of inorganic fine powder (a) having a large specific surface area are introduced in a spur mixer "SMV-20" (trade name) produced by KAWATA Co., Ltd. and stirred for one minute, and then 2.5 parts by weight of the powder (a) is further introduced and stirred for one minute. In order to increase the concentration of the powder (a), the above procedure is repeated.

Preferably, as the carrier inorganic fine powder (b), used is heavy calcium carbonate having a specific surface area of 0.5 to 5 m$^2$/g and containing a calcium component particularly effectuating the dryness of ink.

It is preferable to select the rate of stretching to be within a range of 4 to 10 times both in the longitudinal and transverse directions, and to select the temperature of stretching to be within a range of 150° to 162° C., within a range of 129° to 132° C., within a range of 104° to 115° C. and within a range of 150° to 160° C. in the case where homopolypropylene (melting point: 164° to 167° C.), high density polyethylene (melting point: 134° to 135° C.), polyethylene terephthalate (melting point: 246° to 252° C.) and styrene/polypropylene copolymer (melting point: 155° to 164° C.) are used respectively as the resin. The speed of stretching ranges 50 to 350 m/minute.

The conditions of the stretching rate, the stretching temperature, the stretching speed, the inorganic fine powder content, and the thickness of the surface layer are determined to make the smoothness (Bekk index) of the surface layer (1c) be not larger than 2,000 seconds, preferably not larger than 1,000 seconds.

In the synthetic paper according to the present invention, the laminated resin films forming the paperlike layer and the surface layer are extruded together with each other through one and the same die so that the thickness of the surface layer after stretched can be made to be extremely thin, for example, to be 1/10 to 1 time (generally 0.1 to 10 microns, preferably 0.15 to 2 microns) the average particle diameter of the inorganic fine powder existing in the paper-like layer. The paper dust trouble can be prevented by means of the surface layer. Since the thickness of the surface layer is very thin, the inorganic fine powder in the paper-like layer can partly project from the surface of the synthetic paper through the surface layer so that the writing property of the synthetic paper is good.

The surface layer is suitable for gravure printing when it is made of a resin of polyethylene or polypropylene, but the surface of the surface layer (1c) may be treated with a primer (1d) to make offset multi-color printing more effective.

Examples of the primer include a polyethyleneimine, a poly(ethyleneimine-urea), an ethyleneimine adduct of polyamine polyamide, an epichlorhydrin adduct of polyamine polyamide, a quaternary nitrogen-containing acrylic polymer, etc. Alkali metals salts or alkali earth metals salts may be added to the primer to accelerate the dryness of ink.

The primer is used in the form of an aqueous solution in a concentration of 0.5 to 3% by weight, and the primer is coated to the surface of the surface layer (1c) in an amount of 0.005 to 0.1 g/m$^2$ (as solid) by means of an application tool such as a roll, a spray, a brush, or the like, and thereafter dried.

The smoothness of the thus obtained primer layer (1d) is substantially the same as that of the surface layer (1c), and it is not larger than 2,000 seconds in Bekk index.

When a large number of outdoor posters, maps, or the like, are continuously printed by the process of offset printing by using the synthetic paper of the present invention as offset paper, the frequency of the work of stopping a printing machine to clean the same because of the paper dust trouble caused by drop-out fillers are reduced remarkably so that production (or printing) efficiency can be improved. Further, the synthetic paper is useful as paper for a flow chart of a process for displaying procedure, a poster for giving comfort onto working men's eyes, or the like, which is stuck in a dustless chamber such as a clean room for manufacturing ICs or LSIs. Furthermore, the synthetic paper can be used not only for offset printing, but for gravure printing, flexographic printing, and screen printing.

The moisture permeability of the synthetic paper measured in accordance with JIS Z-0208 (20° C.) was not larger than 50 g/m$^2$ under the conditions of 24 hours and 1 atm. This shows that the synthetic paper is excellent in moistureproof property.

The present invention will be described hereinafter in more detail with reference to examples.

EXAMPLE 1

(1) 16% by weight of calcium carbonate having an average particle diameter of 1.5 micron was mixed with a mixture consisting of 79% by weight of polypropylene with a melt index (MI) of 0.8 and 5% by weight of highdensity polyethylene. The resulting mixture (A) was mulled and molten by an extruder adjusted to 270° C., and then extruded in a form of sheet by the same extruder, and cooled by a cooler to obtain a non-stretched sheet. The sheet was heated up to 140° C., and then stretched in the longitudinal direction to extend the length to be five times as long as the original one.

(2) Polypropylene (C) with an MI of 4.0 and a mixture (B) consisting of 55% by weight of polypropylene with an MI of 4.0 and 45% by weight of calcium carbonate having an average particle diameter of 1.5 micron were mulled and molten by individual extruders separately from each other, laminated within a die, and together extruded to obtain a laminate. Two of the thus obtained laminates were further laminated respectively onto the opposite surfaces of the five-fold stretched sheet which has been obtained in the above item (1), in such a manner that the respective layers of (C) are disposed at the outermost. After once cooled to 60° C. the resulting laminate was heated up to about 160° C., stretched in the transverse direction by a tenter to extend the width to be 7.5 times as long as the original width, annealing-treated at 165° C., cooled to 60° C., and slit at its edges to thereby obtain synthetic paper having five layers (C/B/A/B/C).

The respective thickness of the five layers C, B, A, B, and C was 0.5, 20, 45, 20, and 0.5 microns. The gloss of the synthetic paper was 42%, the surface smoothness 840 seconds, the surface strength 0.62 kg/18 mm width, and the bulk density 0.77 g/cm³. In the use of the paper, the writing property with pencil was good and the writing property with aqueous ink was also good. When the paper was applied to offset printing, 8,000 sheets could be printed before signs of paper dust trouble appeared In this case, the ink drying rate was 185 minutes. On the other hand, when the paper was applied to gravure printing to be used as moisture-proof packaging material, the paper was good in gravure printability and excellent in both water- and moisture-resistance because of its moisture permeability of 4 g/m² measured under the conditions of 24 hours and 1 atm.

EXAMPLES 2 AND 3 AND COMPARATIVE EXAMPLE 1

Three kinds of sheets of five-layered synthetic paper having the characteristics shown in Table 1 were prepared as Examples 2 and 3 and Comparative Example 1 in the same manner as described in Example 1 except that the slit width of the die was varied to change the thickness of the surface layer (C) from 0.5 to 0.2, 1, or 5 microns in the respective three kinds of synthetic paper.

COMPARATIVE EXAMPLE 2

(1) 16% by weight of calcium carbonate having an average particle diameter of 1.5 micron was mixed with a mixture consisting of 79% by weight of polypropylene with a melt index (MI) of 0.8 and 5% by weight of highdensity polyethylene. The resulting mixture (A) was mulled and molten by an extruder adjusted to 270° C., and then extruded in a form of sheet by the same extruder, and cooled by a cooler to obtain a non-stretched sheet. The sheet was heated up to 140° C., and then stretched in longitudinal direction to extend the length to be five times as long as the original one.

(2) A mixture (B) consisting of 55% by weight of polypropylene with an MI of 4.0 and 45% by weight of calcium carbonate having an average particle diameter of 1.5 micron was mulled and molten by an extruder and extruded in a form of sheet through a die to obtain a sheet. Two of the thus obtained sheets were laminated respectively onto the opposite surfaces of the five-fold stretched sheet which has been obtained in the above item (1). After once cooled to 60° C., the resulting laminate was heated up to about 160° C., stretched in the transverse direction by a tenter to extend the width to be 7.5 times as long as the original width, annealing-treated at 165° C., cooled to 60° C., and slit at its edges to thereby obtain synthetic paper having three layers (B/A/B=25μ/45μ/25μ).

TABLE 1

| | Example | | | Comparison | |
|---|---|---|---|---|---|
| | 1 | 2 | 3 | 1 | 2 |
| Surface layer thickness (μ) | 0.5 | 0.2 | 1 | 5 | (25)* |
| Glass (%) | 42 | 29 | 55 | 82 | 16 |
| Surface smoothness (seconds) | 840 | 550 | 1,380 | 5,700 | 450 |
| Paper dust trouble (sheets) | 8,000 | 5,000 | 10,000 or more | 10,000 or more | 600 |
| Density (g/cm³) | 0.77 | 0.77 | 0.78 | 0.79 | 0.77 |
| Dryness of offset ink (minutes) | 185 | 180 | 185 | 200 | 170 |
| Writing property with pencil | Good | Good | Good | Bad | Good |
| Writing property with aqueous ink | Good | Good | Slight blur | Bad | Good |
| Surface strength (kg/18 mm) | 0.62 | 0.59 | 0.62 | 0.67 | 0.50 |

*Paper-like layer

Synthesis of Styrene/Polypropylene Copolymer

SYNTHESIS EXAMPLE 1

A mixture of the following components was heated to 75° C. while stirring in a pressure-proof receptacle, whereafter 100 parts by weight of styrene containing 0.4 part by weight of t-butyl peroxide were introduced in the receptacle and the same temperature as above was maintained for 3 hours.

| | |
|---|---|
| Polypropylene (melting point: 164° C.) | 90 parts by weight |
| Water | 900 parts by weight |
| Polyvinyl alcohol | 2 parts by weight |

Next, the aqueous suspension was heated at 95° C. for 4 hours, and then heated to 125° C., whereafter the same temperature as above was maintained for 5 hours to thus terminate the suspension polymerization of styrene.

Next, after removal of water, the reaction mixture was washed with water and kept in recuperation for 2 days to thus obtain styrene/polypropylene copolymer particles.

SYNTHESIS EXAMPLES 2 AND 3

Two kinds of styrene/polypropylene copolymers were prepared in the same manner as described in Synthesis Example 1 except that the proportion of polypropylene was changed to 50 parts by weight (in Synthesis Example 2) or 250 parts by weight (in Synthesis Example 3) per 100 parts by weight of styrene.

EXAMPLE 4

(1) 16% by weight of calcium carbonate having an average particle diameter of 1.5 micron was mixed with a mixture consisting of 79% by weight of polypropylene with a melt index (MI) of 0.8 and 5% by weight of high density polyethylene. The resulting mixture (A) was mulled and molten by an extruder adjusted to 270° C., and then extruded in a form of sheet the same extruder, and cooled by a cooler to obtain a non-stretched sheet. The sheet was heated up to 140° C., and stretched in the longitudinal direction to extend the length to be five times as long as the original one.

(2) The styrene/polypropylene copolymer (C) with a melt flow rate of 3.7 g per 10 minutes prepared in Synthesis Example 1 and a mixture (B) consisting of 55% by weight of polypropylene with a melt flow rate of 4.0 g per 10 minutes and 45% by weight of inorganic fine powder (70% or more particles thereof have diameters from 1.0 to 2.5 microns when the measured with an electron microscope) were mulled and molten in individual extruders provided separately from each other, the inorganic powder containing sodium aluminosilicate (sold by KOFRAN Inc., in the trade name of "ZEOLEX 17S") with a specific surface area of 135 m$^2$/g which is adsorbed in the surface of calcium carbonate in the proportion of 15% by weight to the latter, the calcium carbonate having an average particle diameter of 1.5 micron and a specific surface area of 1.8 m$^2$/g. The copolymer (C) and the mixture (B) mulled and molten separately were laminated within a die, and together extruded to obtain laminates. Two sheets of the thus obtained laminates were further laminated, with the layers of copolymer (C) outside, respectively onto the opposite surfaces of the fivefold stretched sheet which has been obtained in the above item (1). After once cooled to 60° C., the resulting laminate was heated up to about 160° C., stretched in the transverse direction by a tenter to extend the width to be 7.5 times as long as the original width, annealing-treated at 165° C., cooled to 60° C., and slit at its edge to thereby obtain synthetic paper having five layers (C/B/A/B/C).

The respective thickness of the five layers C, B, A, B, and C was 0.7, 20, 45, 20, and 0.7 microns. The gloss of the synthetic paper was 14%, and the appearance thereof was mat. In the use of the paper, the writing property with pencil was good. Paper dust trouble did not appear before 10,000 sheets were printed. The dryness of ink was speedy and the ink drying rate was 160 minutes. The characteristics of the synthetic paper are shown in Table 2.

EXAMPLES 5 AND 6

Two kinds of synthetic paper were prepared in the same manner as described in Example 4 except that the styrene/polypropylene copolymer particles used in Example 4 were replaced by the styrene/polypropylene copolymer particles having been obtained in Synthesis Example 2 or 3.

What is claimed is:

1. Synthetic paper of multilayer resin films comprising a base layer (1a) constituted by a biaxially stretched film made of the thermoplastic resin, and a laminate provided onto at least one of opposite surfaces of said base layer, said laminate including a paper-like layer (1b) and a surface layer (1c), said paper-like layer being constituted by a uniaxially stretched film made of a thermoplastic resin containing 8 to 65% by weight of inorganic fine powder, said surface layer being constituted by a uniaxially stretched film made of a thermoplastic resin, said surface layer having a thickness t satisfying the following expression $$R \geq t \geq (1/10) \times R$$

in which R represents an average particle diameter of said inorganic fine powder existing in the paper-like layer.

2. The synthetic paper according to claim 1 wherein said surface layer (1c) has a thickness of from 0.15 to 2 microns.

3. Synthetic paper of multilayer resin films comprising a base layer (1a) constituted by a biaxially stretched film made of a thermoplastic resin, and a laminate provided onto at least one of opposite surfaces of said base layer, said laminate including a paper-like layer (1b) and a surface layer (1c), said paper-like layer being constituted by a uniaxially stretched film made of a thermoplastic resin containing 8 to 65% by weight of inorganic fine powder, said paper-like layer containing inorganic fine powder having a specific surface area of 100 m$^2$/g or more in the proportion of 2% by weight or more, said surface layer being constituted by a uniaxially stretched film made of a styrene/polypropylene copolymer, said surface layer having a thickness t satisfying the following expression $$R \geq t \geq (1/10) \times R$$

in which R represents an average particle diameter of said inorganic fine powder existing in the paper-like layer, said styrene/polypropylene copolymer being prepared by the process which comprises dispersing 100 parts by weight of polypropylene particles in water, adding thereto 30 to 400 parts by weight of styrene, and

TABLE 2

| | Example | | |
|---|---|---|---|
| | 4 | 5 | 6 |
| Layer structure | C/B/A/B/C | C/B/A/B/C | C/B/A/B/C |
| Fine powder in paper layer | Sodium alumino-silicate, CaCO$_3$ | Sodium alumino-silicate, CaCO$_3$ | Sodium alumino-silicate, CaCO$_3$ |
| Resin in surface layer | SM/PN (100/90) | SM/PN (100/50) | SM/PN (100/250) |
| Surface layer thickness (μ) | 0.7 | 0.7 | 0.7 |
| Gloss (%) | 14 | 28 | 25 |
| Smoothness (seconds) | 350 | 820 | 510 |
| Paper dust trouble (sheets) | 10,000 or more | 10,000 or more | 10,000 or more |
| Density (g/cm$^3$) | 0.77 | 0.78 | 0.77 |
| Dryness of offset ink (minutes) | 160 | 165 | 170 |
| Writing property with pencil | Good | Good | Good |
| Writing property with aqueous ink | Good | Good | Good |
| Surface strength (kg/18 mm) | 0.63 | 0.61 | 0.62 |

*SM/PN: Styrene/polypropylene copolymer
PN: Homopolypropylene

While the invention has been described in detail and with reference to specific embodiments thereof, it will be apparent to one skilled in the art that various changes and modifications can be made therein without departing from the spirit and scope thereof.

making suspension polymerization of styrene to thereby obtain styrene/polypropylene copolymer particles.

4. The synthetic paper according to claim 3 wherein said surface layer (1c) has a thickness of from 0.15 to 2 microns.

* * * * *